United States Patent [19]

Argo

[11] 4,224,528
[45] Sep. 23, 1980

[54] SOLAR THERMAL AND WIND ENERGY POWER SOURCE

[76] Inventor: William H. Argo, 132 NW. 23, Oklahoma City, Okla. 73103

[21] Appl. No.: 39,065

[22] Filed: May 14, 1979

[51] Int. Cl.³ .............................................. H02P 9/04
[52] U.S. Cl. ....................................... 290/55; 290/44
[58] Field of Search ....................... 290/54, 55, 43, 44; 60/690; 415/2 A

[56] References Cited

U.S. PATENT DOCUMENTS

| | | | |
|---|---|---|---|
| 1,545,633 | 7/1925 | Bender | 415/2 A |
| 3,936,652 | 2/1976 | Levine | 290/55 X |
| 4,004,427 | 1/1977 | Butler | 60/698 |
| 4,012,163 | 3/1977 | Baumgartner et al. | 290/55 X |
| 4,016,725 | 4/1977 | Fiss | 60/690 |
| 4,017,205 | 4/1977 | Bolie | 415/2 A |
| 4,018,543 | 4/1977 | Carson et al. | 415/2 A |
| 4,118,636 | 10/1978 | Christian | 290/54 X |
| 4,119,863 | 10/1978 | Kelly | 290/55 |

FOREIGN PATENT DOCUMENTS 369199 11/1906 France ......................................... 60/26

OTHER PUBLICATIONS

Wind Machines, National Science Foundation, pp. 19, 33, Oct. 1975.

*Primary Examiner*—B. Dobeck
*Attorney, Agent, or Firm*—Robert K. Rhea

[57] ABSTRACT

A transparent panel enclosed tower provides a confined space for solar heating air. An upright wind turbine, mounted on the tower top, communicates with the tower enclosed space. As the solar heated air expands and becomes lighter it is displaced by cooler atmospheric air at the bottom of the tower creating a turbine driving thermal updraft in combination with wind energy driving the turbine. The turbine includes an axial drive shaft driving a gear train in turn driving an electric generator, or the like.

3 Claims, 2 Drawing Figures

U.S. Patent    Sep. 23, 1980    4,224,528

SOLAR THERMAL AND WIND ENERGY POWER SOURCE

BACKGROUND OF THE INVENTION

1. Field of the Invention

The present invention relates to a thermal air and wind driven generator and more particularly to a thermal air collecting and guiding means supplementing a wind driven turbine.

The device of this invention has particular application in providing a power source which generates electricity in semi-arid regions, such as in the great plains or other windy locations where there is an absence of readily available fosil fuels or water for hydroelectric power or cooling of nuclear power plants.

2. Description of the Prior Art

The prior art discloses various means of using either cold or heated air as a power source. An example of heated air power generation is disclosed by U.S. Pat. Nos. 3,936,652 and 4,016,725 which generally utilize an updraft of heated air through a duct to rotate blades driving electric generators. U.S. Pat. No. 4,119,863 discloses solar panels and wind driven turbines as a power source in which the panels are mounted to follow the apparent movement of the sun. Another solar and wind energy conversion system is disclosed by U.S. Pat. No. 4,004,427 in which the thermal air is ducted toward a wind turbine for driving the latter by the flow of air which is supplemented by a compressed air stream supplied by wind driven vertical turbines. The most pertinent prior U.S. patent is U.S. Pat. No. 4,118,636 which generally discloses a thermal energy electric generator formed by a wall closed conical structure directing thermal air through its top in which is mounted an axially hollow combination turbine and generator having blades projecting into its hollow center for generating angular rotation of the turbine/generator by thermal air passing therethrough.

This invention is distinctive over this patent by providing a combination thermal air and wind driven power system which insures continuous operation of the generator during daylight hours and which utilizes wind energy as a power source during nighttime operation.

SUMMARY OF THE INVENTION

A transparent panel enclosed derrick-like tower is provided at its top with an upright wind driven turbine having a drive shaft projecting downward coaxial with the tower. Solar energy heated air within the tower generates a thermal updraft for rotating the turbine as the heated lighter air rises and is displaced by atmospheric air entering the depending end of the tower. Wind energy driving the turbine is combined with the thermal air turbine rotating action during daylight hours and rotates the turbine during nighttime hours. The turbine drive shaft is connected with a gear train in turn driving an electric current generator.

The principal object is to provide a solar thermal and wind energy power source.

DESCRIPTION OF THE PREFERRED EMBODIMENT

Figures 1, 2:
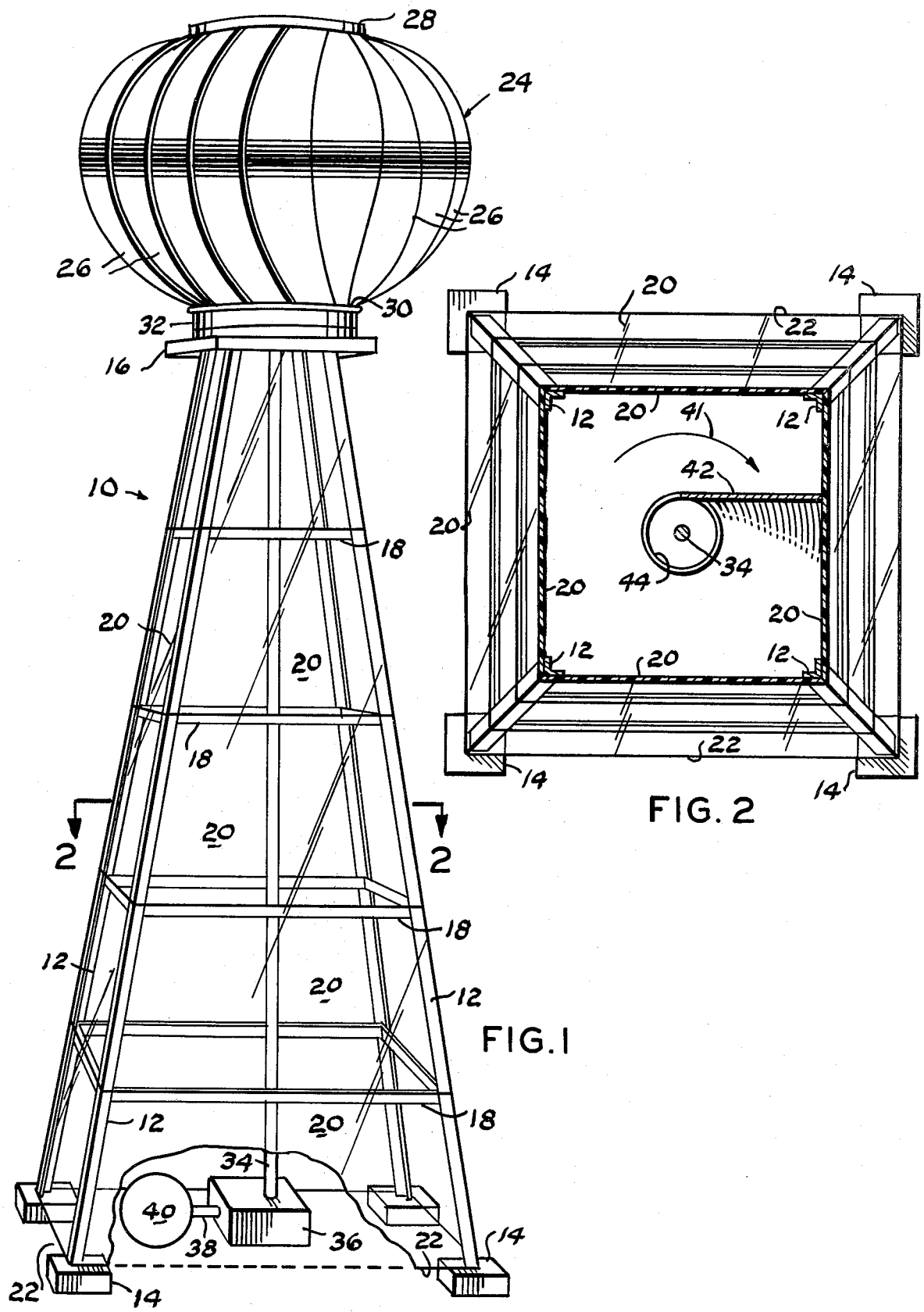
FIG. 1 is a perspective view of the apparatus with a part of the tower wall broken away for clarity; and, FIG. 2 is a horizontal sectional view taken substantially along the line 2—2 of FIG. 1.

Like characters of reference designate like parts in those figures of the drawings in which they occur.

In the drawings:

The reference numeral 10 indicates a tower formed by a derrick having a plurality of legs 12, four in the example shown, mounted on upstanding concrete bases 14 of a selected height with the upper end portions of the legs secured to a centrally open horizontal platform 16. Suitable cross brace members, indicated at 18, interconnect the legs intermediate their length to add rigidity to the tower. Obviously, guy wires may be used in high velocity wind areas. The tower is enclosed by a plurality of impact resistant transparent or translucent plastic panels 20 extending between the legs 12 and cross braces 18 on each side of the tower with the depending edge of the lowermost panel resting on the upper surface of the bases 14, in spaced relation with respect to the surface of the earth, to define an entrance or opening 22 for admitting atmospheric air to the interior of the tower for the purpose presently explained.

A vertical wind turbine 24 is mounted on the tower platform 16 around its central opening. The wind turbine 24 is substantially part-spherical in general configuration having an axially truncated top and bottom. The wind turbine is substantially conventional in that its structure is patterned after the well known roof top wind driven attic ventilators including a plurality of arcuate outwardly bowed overlapping vanes 26 secured at their upper ends to a ring member 28 and at their depending ends to a bearing 30 supported by a band-like tube 32 secured to the tower platform 16. The interior of the turbine is in communication with the space enclosed by the tower.

The wind turbine 4 is provided with an axial shaft forming a drive shaft 34 which is elongated and extends downwardly through the center of the tower 10 and is connected at its depending end with a gear train 36. The output shaft 38 of the gear train is connected with an electric generator 40. The generator is connected in a conventional manner by wiring, not shown, to electrically operated equipment or batteries to be charged, neither of which are shown.

OPERATION

In operation, during daylight hours the heat generating short waves of solar radiation passing through the panels 20 is trapped within the tower thus heating the air therein. As the heated air expands and becomes lighter it flows toward the top of the tower and is displaced by atmospheric air entering the tower through its base openings 22 to generate a thermal updraft to the turbine which includes angular rotation thereof to rotate its drive shaft 34. Simultaneously wind energy driving the turbine is combined with the turbine driving thermal energy.

A cyclonic action in the direction of the arrow 41 is induced on the stream of thermal air by at least one section of sheet material 42 connected at its outer edge surface with the inner wall surfaces of the tower panels 20 and extending upwardly substantially coextensive with the tower in a conveyor blade helical fashion so that its inner edge surface 44 generates a cylindrical surface loosely surrounding the drive shaft 34.

Obviously the invention is susceptible to changes or alterations without defeating its practicability. Therefore, I do not wish to be confined to the preferred embodiment shown in the drawings and described herein.

I claim:

1. A thermal air and wind powered electric current generating system, comprising:
   a tower having a plurality of upwardly converging legs and having a centrally open platform secured to the upper end portion of the legs;
   a plurality of light admitting wall forming panels enclosing said tower for forming a thermal air passageway, the lowermost edge of the lowermost panels being spaced above the surface of the earth a selected distance;
   a thermal air and wind driven turbine mounted on said platform in communication with the interior of said tower, said turbine having a drive shaft projecting downwardly through said platform coextensive with the tower;
   a section of helically wound sheet material extending radially inward from the tower walls substantially coextensive with the tower for inducing a cyclonic action on thermal air moving toward said turbine; and
   a generator operatively connected with said drive shaft.

2. The current generating system according to claim 1 in which said panels are transparent.

3. The current generating system according to claim 1 in which said panels are translucent.

* * * * *